(12) United States Patent
Gallagher et al.

(10) Patent No.: US 9,115,649 B2
(45) Date of Patent: Aug. 25, 2015

(54) FAN STAGGER ANGLE FOR DIRT REJECTION

(75) Inventors: Edward J. Gallagher, West Hartford, CT (US); Becky E. Rose, Colchester, CT (US); Lisa I. Brilliant, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 1013 days.

(21) Appl. No.: 13/176,473

(22) Filed: Jul. 5, 2011

(65) Prior Publication Data

US 2013/0011266 A1    Jan. 10, 2013

(51) Int. Cl.
| | |
|---|---|
| *F02C 7/36* | (2006.01) |
| *F01D 15/12* | (2006.01) |
| *F01D 25/34* | (2006.01) |
| *F02C 7/05* | (2006.01) |
| *F02K 3/06* | (2006.01) |

(52) U.S. Cl.
CPC . *F02C 7/36* (2013.01); *F01D 15/12* (2013.01); *F01D 25/34* (2013.01); *F02C 7/05* (2013.01); *F02K 3/06* (2013.01)

(58) Field of Classification Search
CPC .............. F02C 7/36; F02C 7/05; F01D 15/12; F01D 25/34; F02K 3/06
USPC ............................. 415/121.2; 416/223 A, 239
See application file for complete search history.

(56) References Cited

U.S. PATENT DOCUMENTS

| | | | |
|---|---|---|---|
| 4,055,042 A | 10/1977 | Colley | |
| 4,941,803 A | 7/1990 | Wainauski et al. | |
| 5,299,914 A | 4/1994 | Schilling | |
| 6,071,077 A * | 6/2000 | Rowlands | 416/223 A |
| 6,292,763 B1 | 9/2001 | Dunbar et al. | |
| 7,374,403 B2 * | 5/2008 | Decker et al. | 416/223 A |
| 7,762,086 B2 * | 7/2010 | Schwark | 60/796 |
| 2008/0027686 A1 | 1/2008 | Mollmann et al. | |
| 2008/0181769 A1 | 7/2008 | Wilson et al. | |

FOREIGN PATENT DOCUMENTS

EP    0801230    5/2009

OTHER PUBLICATIONS

Jane's Aero-Engines, Issue Seven, Edited by Biill Gunston, Mar. 2000, pp. 510-512.*

* cited by examiner

*Primary Examiner* — Richard Edgar
(74) *Attorney, Agent, or Firm* — Carlson, Gaskey & Olds, P.C.

(57) ABSTRACT

A gas turbine engine includes a spool, a turbine coupled to drive the spool, a propulsor coupled to be rotated about an axis by the turbine through the spool, and a gear assembly coupled between the propulsor and the spool such that rotation of the turbine drives the propulsor at a different speed than the spool. The propulsor includes a hub and a row of propulsor blades that extend from the hub. Each of the propulsor blades has a span between a root at the hub and a tip, and a chord between a leading edge and a trailing edge. The chord forms a stagger angle α with the axis, and the stagger angle α is less than 15° at a position along the propulsor blade that is within an inboard 20% of the span.

23 Claims, 3 Drawing Sheets

FAN STAGGER ANGLE FOR DIRT REJECTION

STATEMENT REGARDING FEDERALLY SPONSORED RESEARCH OR DEVELOPMENT

This invention was made with government support under contract number NAS3-01138 awarded by NASA. The government has certain rights in the invention.

BACKGROUND

This disclosure relates to gas turbine engines and, more particularly, to an engine having a geared turbofan architecture that is designed to operate with a high bypass ratio and a low pressure ratio.

A gas turbine engine of an aircraft often ingests foreign objects, such as particulate matter. The particulate matter may be dirt, sand or the like. If the particulate matter is permitted to pass into the core flow of the engine, it may damage the engine compressor or other downstream engine components.

SUMMARY

Disclosed is a gas turbine engine and propulsor. The gas turbine engine includes a spool, a turbine coupled to drive the spool, the propulsor coupled to be rotated about an axis by the turbine through the spool, and a gear assembly coupled between the propulsor and the spool such that rotation of the turbine drives the propulsor at a different speed than the spool.

The propulsor includes a hub and a row of propulsor blades that extend from the hub. Each of the propulsor blades has a span between a root at the hub and a tip, and a chord between a leading edge and a trailing edge. The chord forms a stagger angle α with the axis, and the stagger angle α is less than 15° at a position along the propulsor blade that is within an inboard 20% of the span. An objective of the disclosed stagger angle α, in combination with the geared architecture of the engine, is the avoidance of ingestion of particulate matter into the core flow of the engine.

In another aspect, an example gas turbine engine includes a compressor section that extends along a central axis and includes an annular splitter that is spaced a radial distance (D) from the central axis such that there is a core flow radially inward of the annular splitter and a bypass flow radially outward of the annular splitter. A propulsor is located near the compressor section and includes a hub and a row of propulsor blades that extends from the hub. Each of the propulsor blades has a span between a root at the hub and a tip, and a chord between a leading edge and a trailing edge such that the chord forms a stagger angle α with the central axis. The stagger angle α is less than 15° at a position along the propulsor blade that is radially inward of the radial distance (D).

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION

In a turbofan engine, the fan (e.g., propulsor) is a first line of protection from the ingestion of particulate matter into the core flow of the engine. The fan is designed with blade stagger to induce air swirl that helps move incoming particulate matter into the bypass rather than allow the particulate to enter into the core flow. The blade stagger is typically apparent when viewing the fan axially from the front of the engine. In a turbofan engine architecture where the turbine of the engine directly drives the fan at the same angular speed as the turbine, the stagger angle is severe such that an observer would not be able to see past the fan into the engine because the fan blades are angled with the broad sides turned to the observer.

The stagger angle may be a function, at least in part, of a variety of factors, such as the number of blades on the fan, the design pressure ratio of the engine, the design bypass ratio of the engine, the solidity of the fan blades and the rotational speed of the fan blades at full throttle as a function of position along the span of the blades.

As will be described, a disclosed gas turbine engine 20 incorporates a geared architecture and a propulsor 42 that is designed with consideration to at least some of the above factors to achieve a high level of particulate rejection for the geared architecture arrangement and designed operation.

Figure 1:
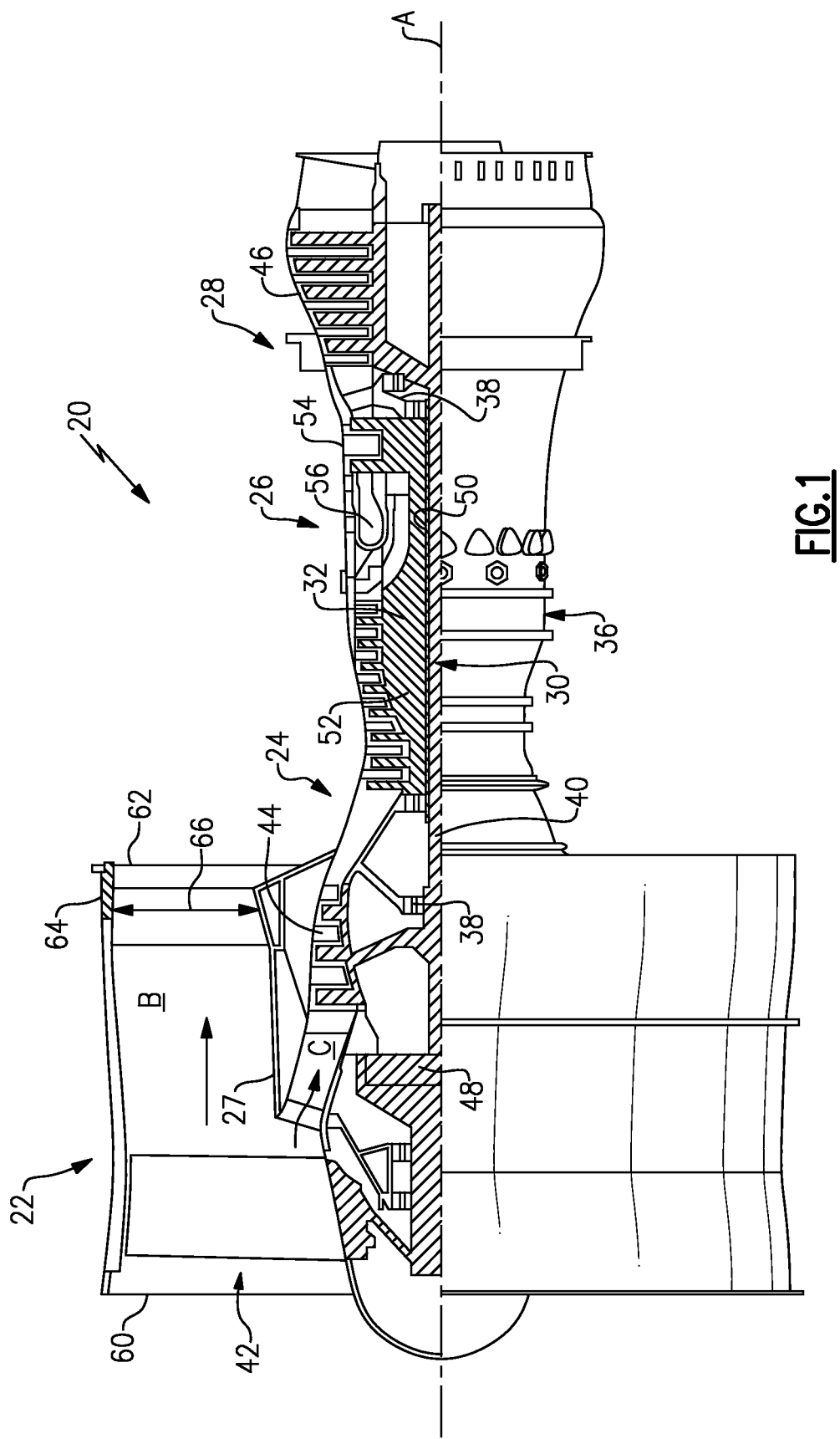
FIG. 1 is a schematic cross-section of a gas turbine engine.

FIG. 1 schematically illustrates the gas turbine engine 20. The gas turbine engine 20 may be a two-spool turbofan that generally incorporates a fan section 22, a compressor section 24, a combustor section 26 and a turbine section 28. Although depicted as a turbofan gas turbine engine, it is to be understood that the concepts described herein are not limited to use with the disclosed arrangement. Alternative engine architectures may include a single-spool design, a three-spool design, or an open rotor design, among other systems or features.

The fan section 22 drives air along a bypass flow passage B while the compressor section 24 drives air along a core flow passage C for compression and communication into the combustor section 26. An annular splitter 27, located adjacent the fan section 22, generally surrounds the compressor section 24 and establishes the core flow passage C.

The engine 20 includes a low speed spool 30 and high speed spool 32 mounted for rotation about an engine central longitudinal axis A relative to an engine static structure 36 via several bearing systems 38. The fan section 22 and the compressor section 24 are concentric with the engine central longitudinal axis A. The low speed spool 30 generally includes an inner shaft 40 that is coupled with the propulsor 42, a low pressure compressor 44 and a low pressure turbine 46. The low pressure turbine 46 drives the propulsor 42 through the inner shaft 40 and a gear assembly 48, which allows the low speed spool 30 to drive the propulsor 42 at a different (e.g. lower) angular speed.

The high speed spool 32 includes an outer shaft 50 that is coupled with a high pressure compressor 52 and a high pressure turbine 54. A combustor 56 is arranged between the high pressure compressor 52 and the high pressure turbine 54. The inner shaft 40 and the outer shaft 50 are concentric and rotate about the engine central longitudinal axis A, which is collinear with their longitudinal axes.

A core airflow in the core flow passage C is compressed in the low pressure compressor 44 then the high pressure compressor 52, mixed with the fuel and burned in the combustor 56, and then expanded over the high pressure turbine 54 and low pressure turbine 46. The turbines 54, 46 rotationally drive the respective low speed spool 30 and high speed spool 32 in response to the expansion.

As shown, the propulsor 42 is arranged at an inlet 60 of the bypass flow passage B and the core flow passage C. Air flow through the bypass flow passage B exits the engine 20 through an outlet 62 or nozzle. For a given design of the propulsor 42, the inlet 60 and the outlet 62 establish a design pressure ratio with regard to an inlet pressure at the inlet 60 and an outlet pressure at the outlet 62 of the bypass flow passage B. As an example, the design pressure ratio may be determined based upon the stagnation inlet pressure and the stagnation outlet pressure at a design rotational speed of the engine 20. In that regard, the engine 20 may optionally include a variable area nozzle 64 within the bypass flow passage B. The variable area nozzle 64 is operative to change a cross-sectional area 66 of the outlet 62 to thereby control the pressure ratio via changing pressure within the bypass flow passage B. The design pressure ratio may be defined with the variable area nozzle 64 fully open or fully closed.

Figure 2:
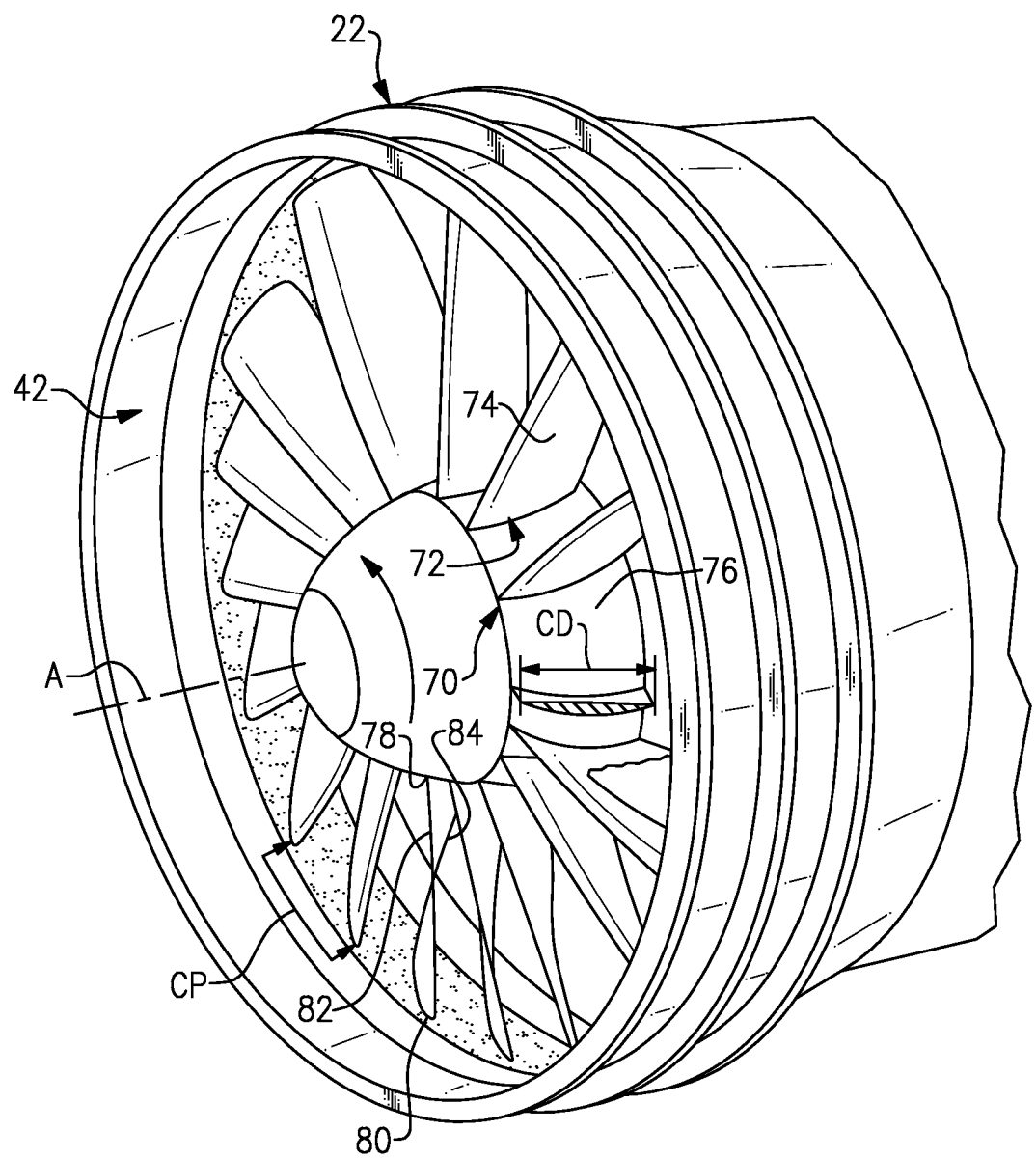
FIG. 2 is a perspective view of a fan section of the engine of FIG. 1.

Referring to FIG. 2, the propulsor 42, which in this example is a fan, includes a rotor 70 having a row 72 of propulsor blades 74 that extend circumferentially around a hub 76. Each of the propulsor blades 74 extends radially outwardly from the hub 76 between a root 78 and a tip 80, and in a chord direction (axially and circumferentially) between a leading edge 82 and a trailing edge 84. A chord 85 (see FIG. 3), also represented by chord dimension (CD), is a straight line that extends between the leading edge 82 and the trailing edge 84 of the propulsor blade 74. The chord dimension (CD) may vary along the span of the propulsor blade 74. For the purpose of later defining solidity, the chord dimension (CD) may be taken at the tips 80 of the propulsor blades 74. The row 72 of propulsor blades 74 also defines a circumferential pitch (CP) that is equivalent to the arc distance between the tips 80 of neighboring propulsor blades 74.

Figure 3:
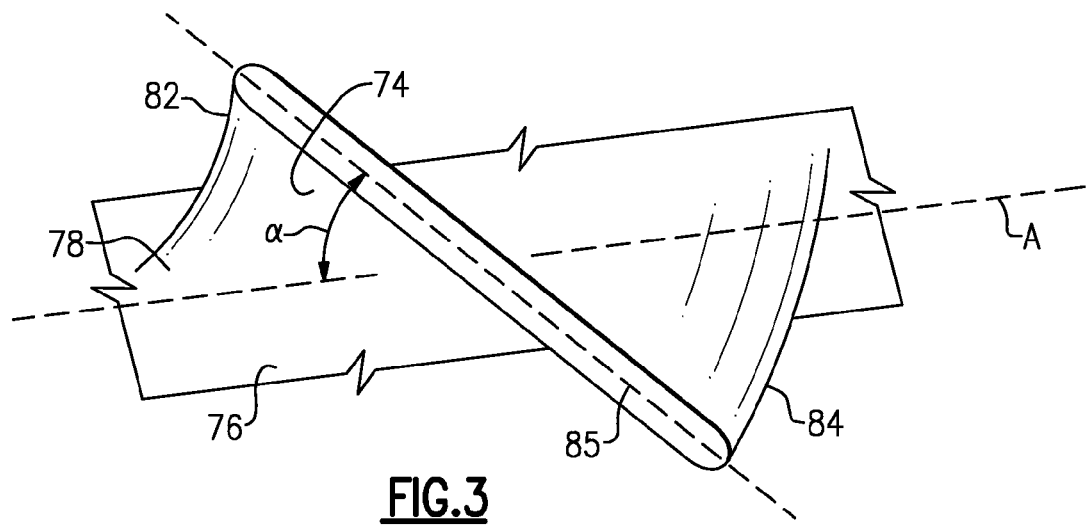
FIG. 3 is an isolated view of a propulsor blade and portion of a hub.

FIG. 3 shows an isolated view of one of the propulsor blades 74 and portion of the hub 76. As shown, the propulsor blade 74 is sectioned at a radial position between the root 78 and the tip 80. The radial position along the propulsor blade 74 can be represented as a percentage of the span of the propulsor blade 74, with the root 78 representing a 0% span and the tip 80 representing a 100% span. The chord 85 is shown on the section of the propulsor blade 74. The chord 85 forms an angle, stagger angle α, with the engine central longitudinal axis A. The stagger angle α can vary with position along the span. The angle can alternatively be represented as an angle between the chord 85 and a line that is orthogonal to the engine central longitudinal axis A, which is equal to 90°−α.

The stagger angle α of the propulsor blades 74 is designed to facilitate the rejection of particulate matter into the bypass flow passage B for a geared architecture. The gear assembly 48 of the disclosed example permits the propulsor 42 to be driven by the low pressure turbine 46 through the low speed spool 30 at a lower angular speed than the low pressure turbine 46. In embodiments, the stagger angle α of the propulsor blades 74 is designed for effective particulate matter rejection at that lower speed operation.

Figure 4:
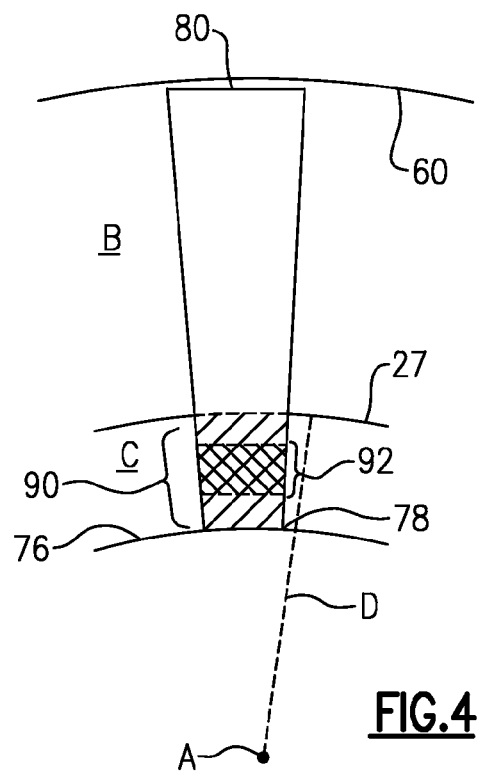
FIG. 4 is an axial view of a propulsor blade and portion of a hub.

FIG. 4 shows an axial view of one of the propulsor blades 74 and portion of the hub 76. The stagger angle α within a section of the span of the propulsor blades 74 is designed for the given geared architecture and lower angular speed at full throttle. In embodiments, the stagger angle α is less than 15° at a position along the propulsor blades 74 that is within an inboard 20% of the span, represented at 90, with the hub 76 being at 0% of the span and the tip 80 being at 100% of the span. In a further embodiment, the stagger angle α is less than 15° at a position along the propulsor blades 74 that is within the range of 5%-15% span, as represented at 92. The spatial orientation of the propulsor blades 74 that results from the disclosed stagger angle α increases the probability that incoming 25 particulate matter will strike the propulsor blades 74 and be rejected into the bypass flow passage B rather than the core flow passage C.

In a further embodiment, the stagger angle α is less than 10° within the inboard 20% of the span or the range of 5%-15% span. Alternatively, the stagger angle α is less than 5° within the inboard 20% of the span or the range of 5%-15% span. In some embodiments, the chord 85 may be substantially parallel to the engine longitudinal central axis A (e.g., within +/−2°) such that the stagger angle α is approximately 0° within the inboard 20% of the span or the range of 5%-15% span.

The stagger angle α may also be described with regard to the location of the annular splitter 27. The annular splitter 27 is spaced a radial distance (D) from the engine longitudinal central axis. The disclosed stagger angles α may be at a position along the propulsor blade 74 that is radially inward of the radial distance (D).

In general, the selected stagger angle α may follow an inverse relationship to the design bypass ratio of the engine 20 with regard to the amount of air that passes through the bypass flow passage B and the amount of air that passes through the core flow passage C such that lower stagger angles correspond to higher bypass ratio designs, and vice versa. In embodiments, the stagger angle α may be less than 15° for a design bypass ratio of 12 and the stagger angle α may be less than 5° for a design bypass ratio of 18.

As described, the stagger angle α may also be a function, at least in part, of the number of blades, the design pressure ratio, the design bypass ratio, and the solidity of the blades. In that regard, embodiments of the propulsor blades 74 may also have some or all of the below-described properties in combination with the disclosed stagger angles α.

In embodiments, the propulsor 42 may include a number (N) of the propulsor blades 74 in the row 72 that is no more than 20. For instance, the number N may be any number from 10 to 20.

Additionally, the propulsor blades 74 define a solidity value with regard to the chord dimension CD at the tips 80 and the circumferential pitch CP. The solidity value is defined as a ratio (R) of CD/CP (i.e., CD divided by CP). In embodiments, the solidity value of the propulsor 42 is between 0.6 and 1.3.

The engine 20 may also be designed with a particular design pressure ratio. In embodiments, the design pressure ratio may be between 1.1 and 1.55.

The engine 20 may also be designed with a particular bypass ratio with regard to the amount of air that passes through the bypass flow passage B and the amount of air that passes through the core flow passage C. As an example, the design bypass ratio of the engine 20 may nominally be 12 or greater.

The propulsor 42 also defines a ratio of N/R. In embodiments, the ratio N/R is between 8 and 28. Tables 1 and 2 below show additional examples of solidity and the ratio N/R for different numbers of propulsor blades 74 that can be used with the disclosed stagger angles α.

TABLE 1

Number of Blades, Solidity and Ratio N/R

| Number of Blades (N) | Solidity | Ratio N/R |
|---|---|---|
| 20 | 1.3 | 15.4 |
| 18 | 1.3 | 13.8 |
| 16 | 1.3 | 12.3 |
| 14 | 1.3 | 10.8 |
| 12 | 1.3 | 9.2 |
| 20 | 1.2 | 16.7 |
| 18 | 1.2 | 15.0 |
| 16 | 1.2 | 13.3 |
| 14 | 1.2 | 11.7 |
| 12 | 1.2 | 10.0 |
| 20 | 1.1 | 18.2 |
| 18 | 1.1 | 16.4 |
| 16 | 1.1 | 14.5 |
| 14 | 1.1 | 12.7 |
| 12 | 1.1 | 10.9 |
| 20 | 1.0 | 20.0 |
| 18 | 1.0 | 18.0 |
| 16 | 1.0 | 16.0 |
| 14 | 1.0 | 14.0 |
| 12 | 1.0 | 12.0 |

TABLE 2

Number of Blades, Solidity and Ratio N/R

| Number of Blades (N) | Solidity | Ratio N/R |
|---|---|---|
| 16 | 1.1 | 14.5 |
| 14 | 1.1 | 12.7 |
| 12 | 1.1 | 10.9 |
| 10 | 1.1 | 9.1 |
| 16 | 1.02 | 15.7 |
| 14 | 1.02 | 13.7 |
| 12 | 1.02 | 11.8 |
| 10 | 1.02 | 9.8 |
| 16 | 0.89 | 18.0 |
| 14 | 0.89 | 15.7 |
| 12 | 0.89 | 13.5 |
| 10 | 0.89 | 11.2 |
| 16 | 0.76 | 21.1 |
| 14 | 0.76 | 18.4 |
| 12 | 0.76 | 15.8 |
| 10 | 0.76 | 13.2 |
| 16 | 0.63 | 25.4 |
| 14 | 0.63 | 22.2 |
| 12 | 0.63 | 19.0 |
| 10 | 0.63 | 15.9 |
| 16 | 0.60 | 26.7 |
| 14 | 0.60 | 23.3 |
| 12 | 0.60 | 20.0 |
| 10 | 0.60 | 16.7 |

The disclosed ratios of N/R also enhance the propulsive efficiency of the disclosed engine 20. For instance, the disclosed ratios of N/R are designed for the geared turbofan architecture of the engine 20 that utilizes the gear assembly 48. That is, the gear assembly 48 allows the propulsor 42 to rotate at a different, lower speed than the low speed spool 30. In combination with the variable area nozzle 64, the propulsor 42 can be designed with a large diameter and rotate at a relatively slow speed with regard to the low speed spool 30. A relatively low speed, relatively large diameter, and the geometry that permits the disclosed ratios of N/R contribute to the reduction of performance debits, such as by lowering the speed of the air or fluid that passes over the propulsor blades 74.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
a spool;
a turbine coupled with said spool;
a propulsor coupled to be rotated about an axis by said turbine through said spool; and
a gear assembly coupled between said propulsor and said spool such that rotation of said turbine drives said propulsor at a different speed than said spool,
wherein said propulsor includes a hub and a row of propulsor blades that extend from said hub, each of said propulsor blades has a span between a root at said hub and a tip, and a chord between a leading edge and a trailing edge such that said chord forms a stagger angle α with said axis, and said stagger angle α is less than 15° at a position along said propulsor blade that is within an inboard 20% of said span, with said hub being at 0% of said span and said tip being at 100% of said span.

2. The gas turbine engine as recited in claim 1, wherein said stagger angle α is less than 10° at said position.

3. The gas turbine engine as recited in claim 1, wherein said stagger angle α is less than 5° at said position.

4. The gas turbine engine as recited in claim 1, wherein said chord at said position is substantially parallel to said axis.

5. The gas turbine engine as recited in claim 1, wherein said position is within 5-15% of said span.

6. The gas turbine engine as recited in claim 1, wherein said propulsor is located at an inlet of a bypass flow passage having a design pressure ratio that is between 1.1 and 1.55 with regard to an inlet pressure and an outlet pressure of said bypass flow passage.

7. The gas turbine engine as recited in claim 1, wherein said chord has a chord dimension (CD) at said tips, said row of propulsor blades defines a circumferential pitch (CP) with regard to said tips, and said row of propulsor blades has a solidity value (R) defined as CD/CP that is between 0.6 and 1.3.

8. The gas turbine engine as recited in claim 1, wherein said row of propulsor blades includes a number (N) of said propulsor blades that is no more than 20.

9. The gas turbine engine as recited in claim 1, wherein said chord has a chord dimension (CD) at said tips, said row of propulsor blades defines a circumferential pitch (CP) with regard to said tips, said row of propulsor blades has a solidity value (R) defined as CD/CP, and said row of propulsor blades includes a number (N) of said propulsor blades that is no more than 20 such that a ratio of N/R is between 8 and 28.

10. The gas turbine engine as recited in claim 1, wherein said stagger angle α varies with position of said chord along said span.

11. The gas turbine engine as recited in claim 1, wherein said stagger angle α is less than 5° at said position to reject particulate into a bypass flow passage.

12. The gas turbine engine as recited in claim 11, wherein said bypass flow passage has a bypass ratio of 18.

13. A gas turbine engine comprising:
a compressor section that extends along a central axis and includes an annular splitter spaced a radial distance (D) from said central axis such that there is a core flow radially inward of said annular splitter and a bypass flow radially outward of said annular splitter; and
a propulsor adjacent said compressor section, said propulsor including a hub and a row of propulsor blades that extend from said hub, each of said propulsor blades has a span between a root at said hub and a tip, and a chord between a leading edge and a trailing edge such that said chord forms a stagger angle $\alpha$ with said central axis, and said stagger angle $\alpha$ is less than 15° at a position along said propulsor blade that is radially inward of said radial distance (D).

14. The gas turbine engine as recited in claim 13, wherein said position along said propulsor blade is within an inboard 20% of said span, with said hub being at 0% of said span and said tip being at 100% of said span.

15. The gas turbine engine as recited in claim 14, wherein said position is within 5-15% of said span.

16. The gas turbine engine as recited in claim 13, including a design bypass ratio with regard to said bypass flow and said core flow that is at least 12.

17. The gas turbine engine as recited in claim 13, wherein said stagger angle $\alpha$ is less than 5° at said position to reject particulate into a bypass flow passage.

18. A propulsor for use in a gas turbine engine, the propulsor comprising:
a rotor including a row of propulsor blades extending radially outwardly from a hub that is rotatable around an axis, each of said propulsor blades has a span between a root at said hub and a tip, and a chord between a leading edge and a trailing edge such that said chord forms a stagger angle $\alpha$ with said axis, and said stagger angle $\alpha$ is less than 15° at a position along said propulsor blade that is within an inboard 20% of said span, with said hub being at 0% of said span and said tip being at 100% of said span.

19. The propulsor as recited in claim 18, wherein said stagger angle $\alpha$ is less than 10° at said position.

20. The propulsor as recited in claim 18, wherein said stagger angle $\alpha$ is less than 5° at said position.

21. The propulsor as recited in claim 18, wherein said chord at said position is substantially parallel to said axis.

22. The propulsor as recited in claim 18, wherein said position is within 5-15% of said span.

23. The propulsor as recited in claim 18, wherein said stagger angle $\alpha$ is less than 5° at said position to reject particulate.

* * * * *